United States Patent
Torrez et al.

(10) Patent No.: US 7,385,518 B2
(45) Date of Patent: *Jun. 10, 2008

(54) COMPACT FUSED DISCONNECT SWITCH

(75) Inventors: Jaime Alberto Torrez, O'Fallon, MO (US); Ronald E. Mollet, Ellisville, MO (US); B. Heath Scoggin, Wildwood, MO (US)

(73) Assignee: Cooper Technologies Company, Houston, TX (US)

( * ) Notice: Subject to any disclaimer, the term of this patent is extended or adjusted under 35 U.S.C. 154(b) by 128 days.

This patent is subject to a terminal disclaimer.

(21) Appl. No.: 11/393,399

(22) Filed: Mar. 30, 2006

(65) Prior Publication Data

US 2006/0220893 A1 Oct. 5, 2006

Related U.S. Application Data

(63) Continuation of application No. 10/715,306, filed on Nov. 17, 2003, now Pat. No. 7,049,973, which is a continuation of application No. 09/892,007, filed on Jun. 26, 2001, now Pat. No. 6,696,969.

(60) Provisional application No. 60/215,441, filed on Jun. 30, 2000.

(51) Int. Cl.
*G08B 21/00* (2006.01)

(52) U.S. Cl. ............... 340/638; 340/657; 340/815.4; 340/640; 340/664

(58) Field of Classification Search .................. None
See application file for complete search history.

(56) References Cited

U.S. PATENT DOCUMENTS

| 3,056,870 | A | 10/1962 | Andres |
| 4,444,455 | A | 4/1984 | Wiancko et al. |
| 4,499,447 | A | * | 2/1985 | Greenberg ............... 337/266 |
| 4,559,504 | A | 12/1985 | Krec |
| 4,772,219 | A | * | 9/1988 | Falchetti ................... 439/490 |
| 4,906,212 | A | 3/1990 | Mixon, Jr. |
| 4,913,678 | A | 4/1990 | Avellino et al. |
| 5,260,679 | A | 11/1993 | Viscogliosi |
| D367,041 | S | 2/1996 | Alfaro et al. |

(Continued)

FOREIGN PATENT DOCUMENTS

JP 04-275018 4/1994

(Continued)

*Primary Examiner*—Benjamin C. Lee
*Assistant Examiner*—Son Tang
(74) *Attorney, Agent, or Firm*—King & Spalding LLP

(57) ABSTRACT

A fused disconnect switch assembly includes a pull out fuse assembly and a switch housing assembly. The fuse assembly includes a line side conducting portion, a load side conducting portion, and a fuse element therebetween. The switch housing assembly includes a fuse receptacle for receiving the fuse, a first contact assembly coupled to the line side conducting portion of the fuse and a second contact assembly coupled to the load side conducting portion of the fuse when the fuse is inserted into the receptacle. An open fuse indication device is in communication with conducting portions of the fuse, and an alarm terminal output extends from the switch assembly housing and is in communication with the open fuse indication device. The open fuse indication device provides local fuse state indication and the alarm terminal output facilitates remote fuse state indication when coupled to external circuitry.

16 Claims, 10 Drawing Sheets

U.S. PATENT DOCUMENTS

| | | | |
|---|---|---|---|
| 5,559,662 A * | 9/1996 | Happ et al. | 361/104 |
| 5,739,737 A | 4/1998 | Hatton | |
| 5,841,337 A * | 11/1998 | Douglass | 337/198 |
| D429,223 S | 8/2000 | Douglass et al. | |
| 6,157,287 A | 12/2000 | Douglass et al. | |
| 6,317,311 B1 * | 11/2001 | Middlehurst et al. | 361/637 |
| D452,484 S | 12/2001 | Milanczak | |
| 6,566,996 B1 * | 5/2003 | Douglass et al. | 337/243 |
| 6,696,969 B2 | 2/2004 | Torrez et al. | |
| 2002/0064013 A1 | 5/2002 | Milanczak | |

FOREIGN PATENT DOCUMENTS

| | | |
|---|---|---|
| JP | 07-182600 | 7/1997 |
| WO | WO 98/56075 | 12/1998 |

* cited by examiner

COMPACT FUSED DISCONNECT SWITCH

CROSS REFERENCE TO RELATED APPLICATIONS

This application is a continuation application of U.S. application Ser. No. 10/715,306 filed Nov. 17, 2003, now U.S. Pat. No. 7,049,973, which is a continuation application of U.S. application Ser. No. 09/892,007 filed Jun. 26, 2001, now U.S. Pat. No. 6,696,969 which claims the benefit of U.S. Provisional Application No. 60/215,441 filed Jun. 30, 2000.

BACKGROUND OF THE INVENTION

This invention relates generally to disconnect switches, and, more particularly, to fused disconnect switches.

Fuses are widely used as overcurrent protection devices to prevent costly damage to electrical circuits. Fuse terminals typically form an electrical connection between an electrical power source and an electrical component or a combination of components arranged in an electrical circuit. One or more fusible links or elements, or a fuse element assembly, is connected between the fuse terminals, so that when electrical current through the fuse exceeds a predetermined limit, the fusible elements melt and opens one or more circuits through the fuse to prevent electrical component damage.

In some applications, fuses are employed not only to provide fused electrical connections but also for connection and disconnection, or switching, purposes to complete or break an electrical connection or connections. As such, an electrical circuit is completed or broken through conductive portions of the fuse, thereby energizing or de-energizing the associated circuitry. Typically, the fuse is housed in a fuse holder having terminals that are electrically coupled to desired circuitry. When conductive portions of the fuse, such as fuse blades, terminals, or ferrules, are engaged to the fuse holder terminals, an electrical circuit is completed through the fuse, and when conductive portions of the fuse are disengaged from the fuse holder terminals, the electrical circuit through the fuse is broken. Therefore, by inserting and removing the fuse to and from the fuse holder terminals, a fused disconnect switch is realized.

Known fused disconnect switches of this type, however, are disadvantaged in certain applications. For instance, in telecommunications applications, increasing power demands of equipment loads have rendered many fused disconnect switches inadequate. In addition, limited field wiring options can frustrate the use of a common line input bus and may require auxiliary components for connection to telecommunication distribution panels. Still further, especially when a large number of disconnect switches are employed, quick and accurate identification of opened fuses is necessary so that opened fuses may be identified and replaced. Conventional fuse state identification mechanisms are not as reliable as desired for telecommunications applications. For at least the above reasons, use of fused disconnect switches have not completely met the needs of certain end applications, such as use in telecommunications systems.

BRIEF SUMMARY OF THE INVENTION

In an exemplary embodiment, a fused disconnect switch assembly includes a pull out fuse assembly and a switch housing assembly. The fuse assembly includes a line side conducting portion, a load side conducting portion, and a fuse element therebetween. The switch housing assembly includes a housing defining a fuse receptacle for receiving the fuse, a first contact assembly located in the housing and coupled to the line side conducting portion of the fuse when the fuse is inserted into the receptacle, and a second contact assembly located in the housing and coupled to the load side conducting portion of the fuse when the fuse is inserted into the receptacle. An open fuse indication device is in communication with the line side conducting portion of the fuse and the load side conducting portion of the fuse, and an alarm terminal output extends from the switch assembly housing and is in communication with the open fuse indication device. The open fuse indication device provides local fuse state indication and the alarm terminal output facilitates remote fuse state indication when coupled to external circuitry in the end application.

In various embodiments, the switch housing assembly includes a bullet contact assembly, a box contact assembly, and a terminal stud for increased wiring options in the field. A common contact bus bar is provided for connection to a terminal stud in one embodiment for further wiring options and auxiliary connections.

In an exemplary embodiment, the fuse line side conducting portion and fuse load side conducting portion includes terminal blades that are extended through terminal openings extending through a bottom of the fuse receptacle. The terminal blades are engaged to the terminal contact assemblies of the switch housing assembly. The open fuse indication device includes a high resistance electronic circuit coupled to the terminal blades of the fuse, and the circuit includes a transistor element and an light emitting diode ("LED"). The LED is activated by the transistor element in response to a voltage drop across the electronic circuit. The switch housing further includes an internal alarm terminal engaging an alarm terminal of the fuse within the fuse receptacle, and further in communication with the alarm output terminal The open fuse indication device therefore provides local fuse state indication via illumination of the LED and generates an alarm signal that is output through the switch housing alarm output for remote fuse state identification.

A fused disconnect switch is therefore provided with a variety of wiring options including a common bus connection, without employing auxiliary components. Reliable local and remote fuse state indication is provided so that opened fuses may be quickly identified and replaced. A versatile, compact fused disconnect switch package is therefore provided that is better suited for applications wherein conventional fused disconnect switches have been found less than desirable, such as telecommunications applications.

DETAILED DESCRIPTION OF THE INVENTION

Figure 1:
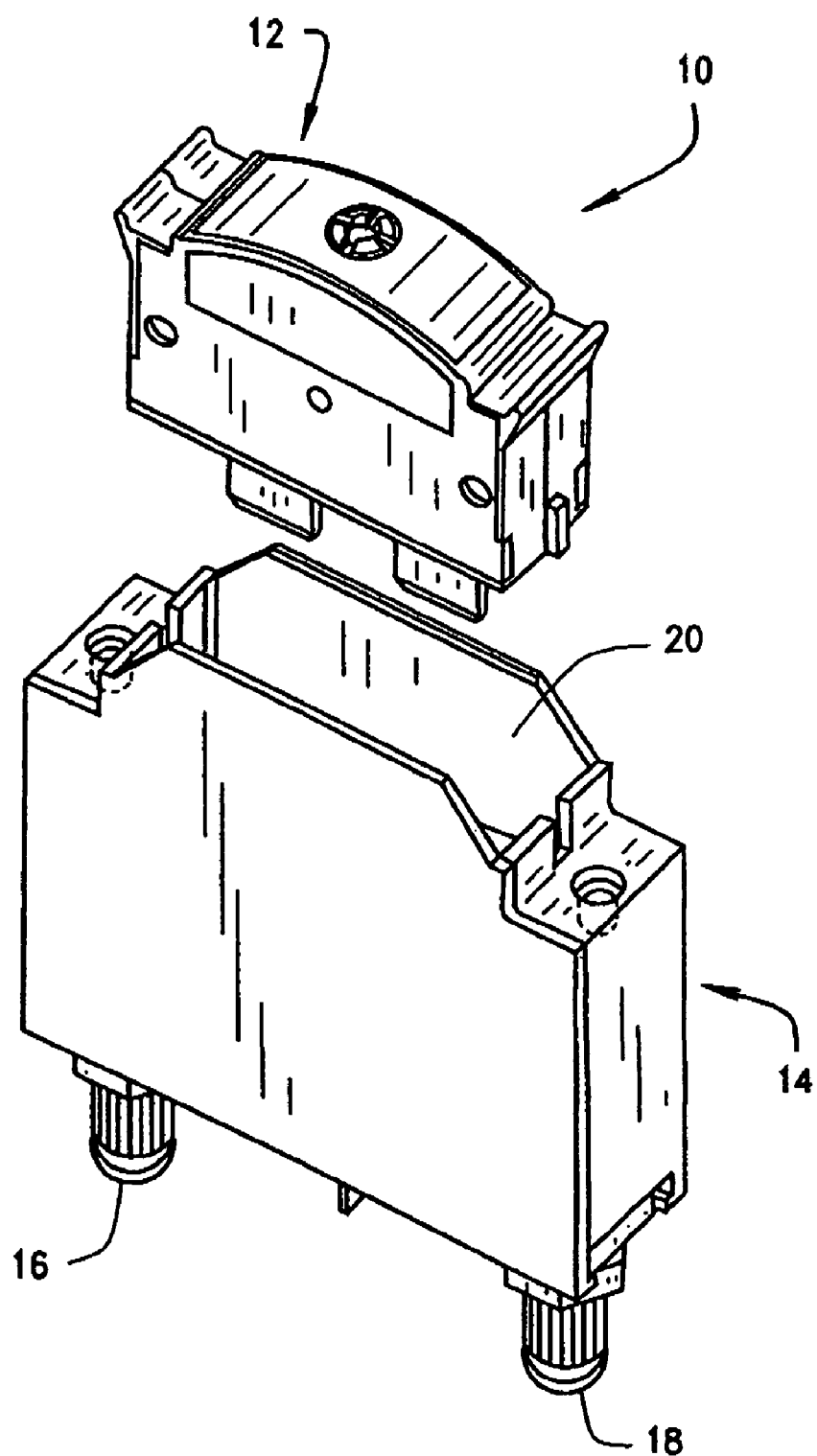
FIG. 1 is an exploded perspective view of a fused disconnect switch assembly.

FIG. 1 is an exploded perspective view of a fused disconnect switch assembly 10 including a fuse 12 for removable engagement with a switch housing assembly 14. Switch housing assembly 14 includes, in one embodiment, a first bullet contact assembly 16 for plug in connection to a line input bus (not shown) and a second bullet contact assembly 18 for plug-in connection to load side equipment (not shown), such as a distribution panel. When fuse 12 is fully inserted into a switch housing assembly fuse receptacle 20, an electrical circuit is completed through fuse 12 via first and second bullet contact assemblies 16, 18. As such, fused disconnect switch assembly 10 is ideally suited, in an exemplary embodiment, for protecting telecommunications equipment from damaging fault currents as well as facilitating disconnection of the load by extraction of fuse 12 from switch housing assembly 14. It is understood, however, that the benefits of the present invention accrue generally to many fused systems, and the present invention is in no way intended to be restricted to any particular use or application.

When inserted into switch housing assembly 14, in an exemplary embodiment fuse 12 at least partially protrudes from or extends from fuse receptacle 20 so that local fuse state indication, explained in detail below, is accomplished by visual inspection of the exterior of fuse 12 while operatively connected to switch housing assembly 14. In addition, because in an illustrative embodiment a portion of fuse 12 extends from fuse receptacle, fuse 12 may be readily inserted into and removed from switch housing assembly 14 by hand, i.e., without requiring tools, by simply gripping the top portion of fuse 12 and manipulating fuse 12 within fuse receptacle 20 to accomplish the switching function described below.

Figure 2:
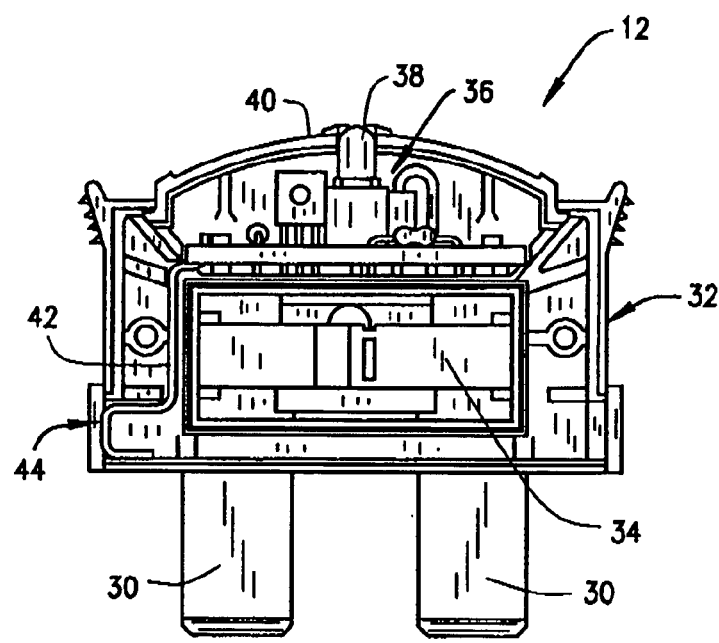
FIG. 2 is a cross-sectional view of a fuse assembly shown in FIG. 1.

FIG. 2 is a cross-sectional view of fuse 12 (also shown in FIG. 1) including first and second fuse terminals 30 extending from a fuse housing 32 and in electrical communication with a primary fuse link 34 mounted in fuse housing 32 and extending between first and second terminals 30. When an electrical circuit is completed through fuse terminals 30, current flows through primary fuse link 34, and as current flowing through primary fuse link 34 approaches a predetermined threshold, i.e., a fault current, primary fuse link 34 melts, vaporizes or otherwise opens and prevents electrical current from flowing therethrough. Thus, an open circuit is created between fuse terminals 30 and associated load side electrical components and circuits are isolated by fuse 12 and thereby protected from damaging fault currents. An arc-quenching material (not shown), such as silica sand, surrounds primary fuse link 34 within housing 32 to prevent and/or suppress arcing between fuse terminals 30 when primary fuse link 34 opens.

In one embodiment, primary fuse link 34 is fabricated so that fuse 12 has a rating of 25 to 125 amps and a safety interrupt of 100 KA at 80 Vdc. In alternative embodiments, different fuse ratings are obtained with differently fabricated primary fuse links 34 inside fuse housing 32 so that differently rated fuses have substantially the same size and shape, or footprint, and further so that a variety of different fuses may be employed with a single switch housing assembly, such as switch housing assembly 14 (shown in FIG. 1) for versatility in the field. It is contemplated, however, that the benefits of the present invention accrue to a wide variety of fused systems employing fuses of different ratings, shapes, and sizes. Therefore, the specific fuse embodiment illustrated and described herein is for illustrative purposes only and is not intended to limit the invention in any aspect.

Fuse 12 also includes a local and remote open-fuse indication device 36 for indicating an operational state of fuse 12. Open fuse indication device 36 includes a high resistance electronic circuit (described further below) coupled to a light emitting diode or LED 38 that is visible through a top surface 40 of fuse housing 32. As explained in detail below, LED 38 is illuminated when primary fuse link 34 is opened.

It is contemplated that in alternative embodiments electromechanical fuse state indication mechanisms may be employed. For example, in one illustrative embodiment, in lieu of an electronic circuit, open-fuse indication device 36 includes a secondary fuse link (not shown in FIG. 2) electrically connected between fuse terminals 30 in parallel with primary fuse link 34. The secondary fuse link has a much greater electrical resistance than primary fuse link 34 so that when fuse 12 is operational, i.e., when primary fuse link 34 has not opened, substantially all the current flowing through fuse 12 passes through primary fuse link 34. However, when primary fuse link 34 opens and the circuit is broken through primary fuse link 34, current flows through the secondary fuse link and triggers an electronic or mechanical indicator for local and remote indication of the opened fuse.

In still further alternative embodiments, other known electrical, mechanical, or electromechanical devices are used to visibly indicate an operational state of fuse 12.

Open fuse indication device 36 further includes an electrically conductive alarm terminal 42 protruding through an opening 44 in fuse housing 32. When fuse terminal alarm 42 is coupled to a resistive load, such as a relay coil (not shown) typically found in existing telecommunications equipment, a signal is sent to the relay coil when primary fuse link 34 has opened, thereby directing attention to a particular location where an opened fuse is located. Local fuse state indication identifies the open fuse or fuses in the specified location. Thus, opened fuses may be efficiently located even when large numbers of fuses in various locations are employed.

Figure 3:
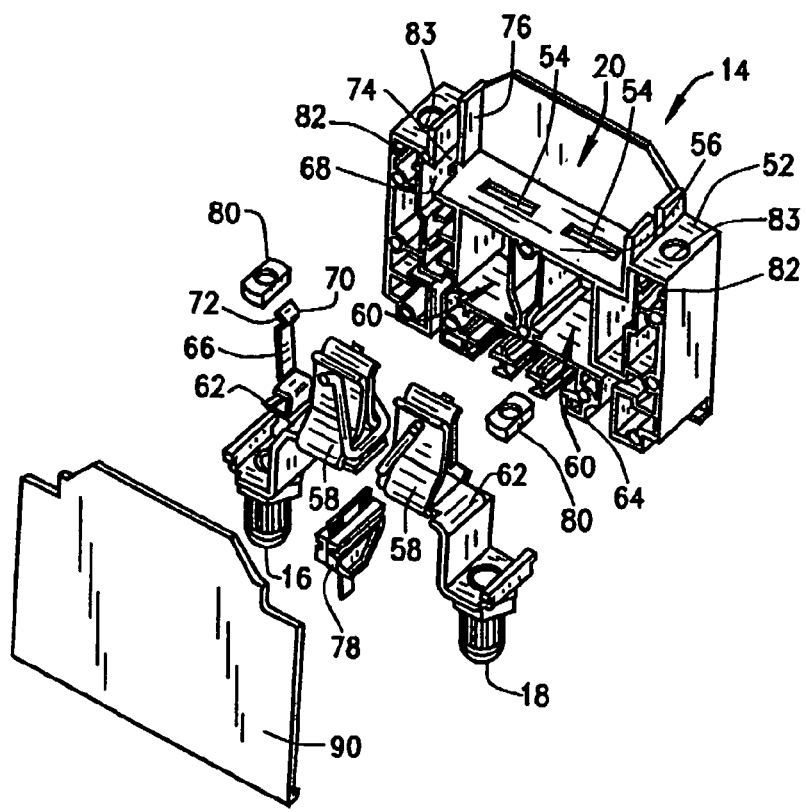
FIG. 3 is a perspective assembly view of the switch housing assembly shown in FIG. 1.
Figure 4:
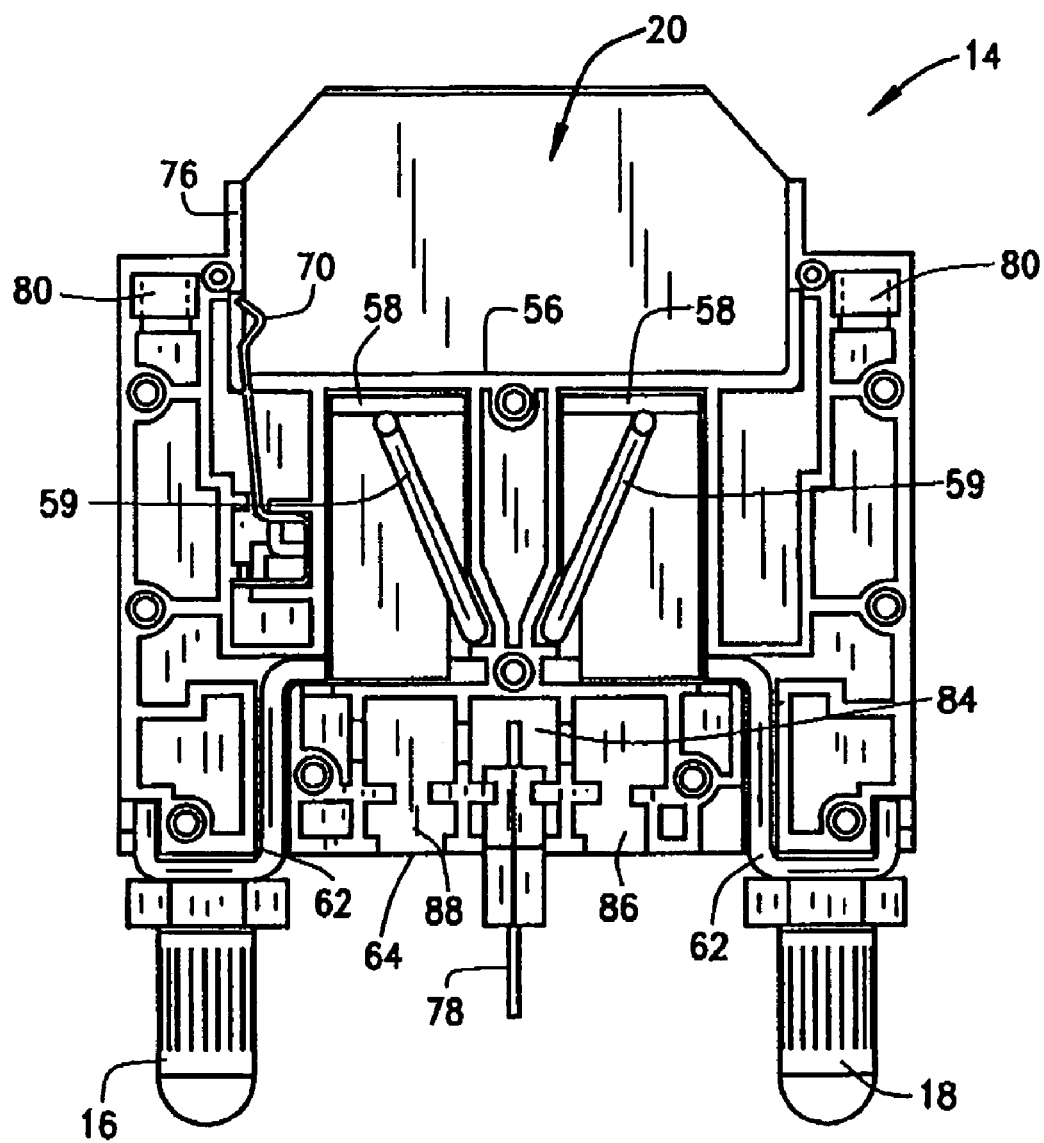
FIG. 4 is a side elevational view with parts removed of the switch housing assembly shown in FIG. 3.

FIGS. 3 and 4 illustrate switch housing assembly 14 of fused disconnect switch assembly 10 (shown in FIG. 1). Switch housing assembly 14 includes a housing 52 fabricated from a non-conductive material and having fuse terminal openings 54 in a bottom 56 of fuse receptacle 20 for receiving fuse terminal blades 30 (shown in FIG. 2). An electrically conductive resilient clip 58 and associated reinforcing, pre-stressed wire spring element 59 is located below each fuse terminal opening 54 and located in a cavity 60 below fuse receptacle 20. A bridge portion 62 extends downwardly from each clip 58 and to electrically conductive bullet contact assemblies 16, 18 for connection to either a line input bus (not shown) or a load bus (not shown). When fuse terminals 30 are inserted through fuse terminal openings 54, fuse terminals 30 are received in clips 58 and thus are electrically coupled to bullet contact assemblies 16, 18 protruding through a bottom 64 of housing 52.

As internal conductive portions of switch housing assembly 14 are located below terminal openings 54 of fuse receptacle bottom surface 56, inadvertent contact with energized conductive portions of switch housing assembly 14 is substantially prevented, thereby providing a safe disconnect function for fuse 12. In alternative embodiments, however, it is appreciated that conductive portions of switch housing assembly 14 may remain exposed in fuse receptacle 20 by extending conductive portions of switch housing assembly 14 into receptacle 20 for connection to conductive portions of a fuse. As such, other types of fuses, such as ferrule or cartridge fuses having primary fuse links may be accommodated in addition to or in lieu of fuse 12 (shown in FIGS. 1 and 2 and described above) having terminal blades 30. It is believed that those in the art may make the necessary modifications to switch housing assembly 14 to accommodate these different types of fuses without further explanation.

A switch housing internal alarm terminal 66 is positioned adjacent one of fuse clips 58 within an adjacent cavity 68, and includes a projecting ridge 70 at a top end 72 that protrudes through an opening 74 in a side wall 76 of fuse receptacle 20. Thus, when fuse 12 is fully inserted into fuse receptacle 20, alarm terminal projecting ridge 70 contacts fuse alarm terminal 42 (shown in FIG. 2) through housing opening 44 (shown in FIG. 2). Internal alarm terminal 66 is further coupled to a remote output alarm terminal 78 that extends though a bottom 64 of switch housing 52, thereby completing an electrical path for an open fuse alarm signal for transmission to end use equipment (not shown) during an open fuse condition.

In an exemplary embodiment, output alarm terminal 78 is disposed in a central cavity 84 formed into a lower portion of housing 52 adjacent housing bottom 64, and as such is approximately centered between bullet contact assemblies 16, 18. In alternative embodiments, output alarm terminal is received in adjacent cavities 86, 88 formed into a lower portion of housing 52 on either side of cavity 78. Thus, output alarm terminal is selectively positionable between cavities 84, 86, 88 to the most desirable position for a given application.

Mounting insert footings 80 are received in receptacles 82 on either side of fuse receptacle 20 so that switch housing assembly 14 may be secured in position within the end use application. Each mounting footing 80 includes a threaded bore for receiving a fastener (not shown) inserted through mounting apertures 83 located on either side of fuse receptacle 20. Thus, insert footings 80, when engaged by a fastener, securely position switch housing assembly 14 in a desired position.

A nonconductive cover 90 is affixed to housing 52 to form a safe, protective enclosure for the above-described components of switch housing assembly 14 and to complete fuse receptacle 20. In one embodiment, housing 52 and cover 90 are fabricated from nonconductive materials, such as plastic and thermoplastic materials, capable of withstanding operating environment of fuse disconnect switch assembly 10 and conditions capable of opening fuse 12. In an illustrative embodiment, cover 90 is permanently bonded to housing 52 according to known method and techniques, such as for example, ultrasonic bonding techniques.

A fused disconnect switch assembly 10 is therefore provided that facilitates installation to existing equipment without auxiliary components or hand wired connections. Switching is achieved by inserting or extracting a pullout fuse assembly, such as fuse 12, from switch housing fuse receptacle 20, and local and remote opened fuse indication provides ready indication of opened fuses for replacement. Because a variety of differently rated fuses are accommodated by switch housing receptacle 20, a versatile fused disconnect switch assembly 10 is provided that is suitable for a wide variety of applications.

Figure 5:
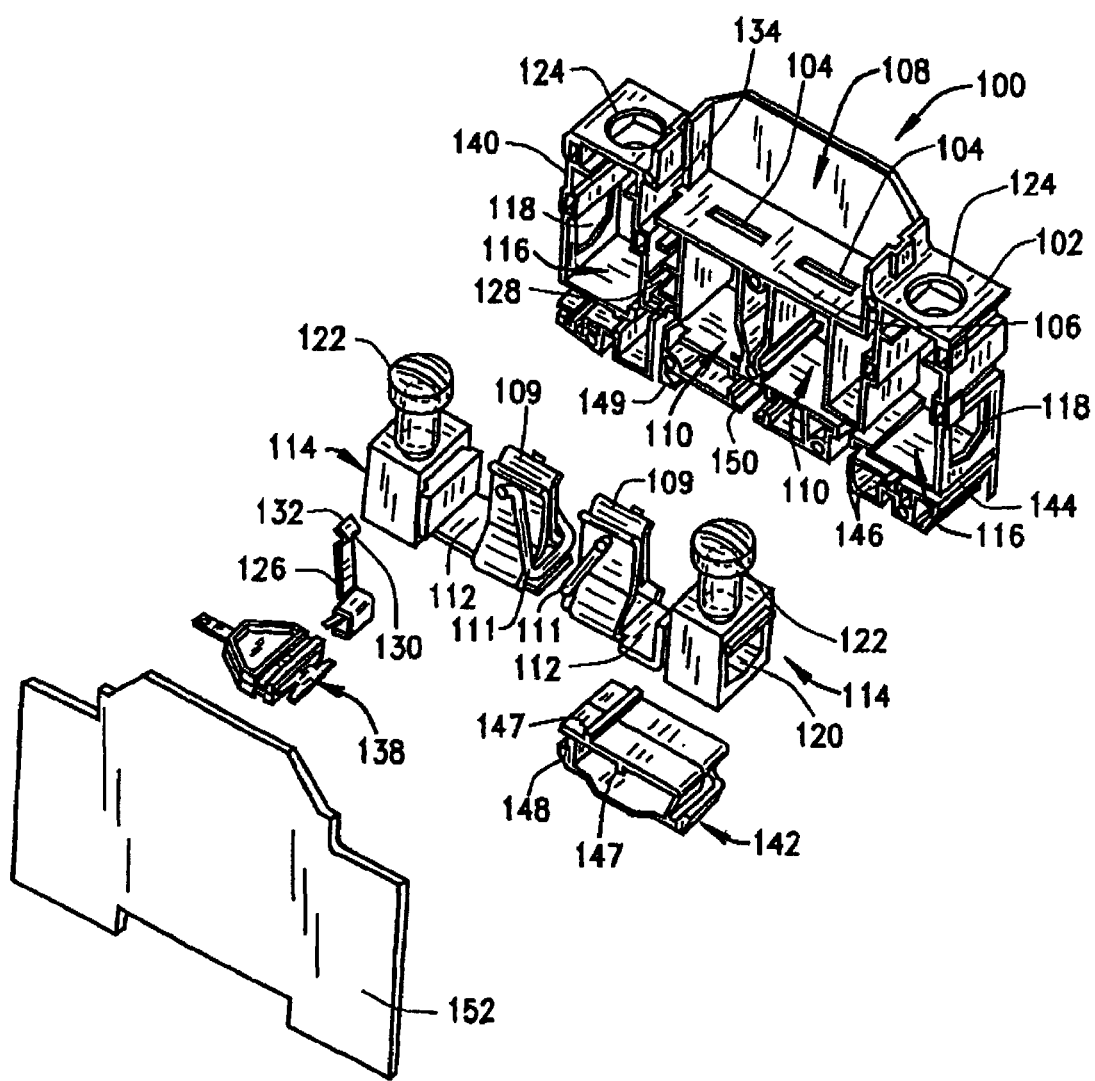
FIG. 5 is a perspective assembly view of a second embodiment of a switch housing assembly.
Figure 6:
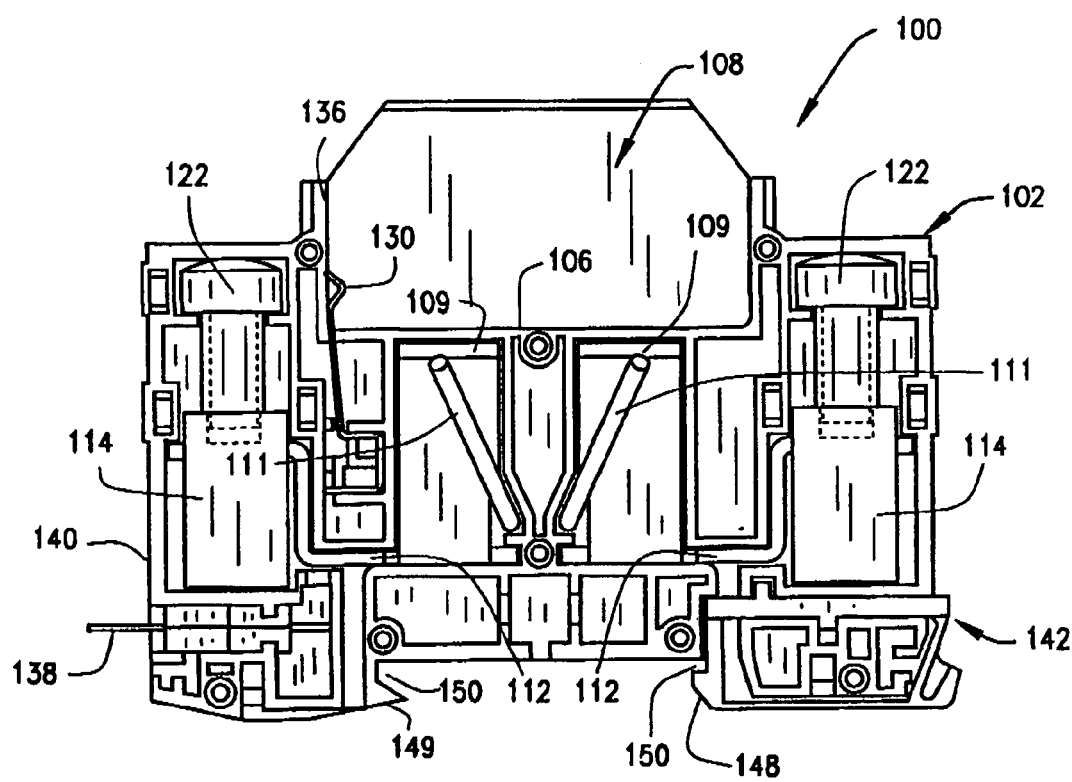
FIG. 6 is a side elevational view with parts removed of the switch housing assembly shown in FIG. 5.

FIGS. 5 and 6 illustrate a second embodiment of a switch housing assembly 100 for use with a fuse, such as fuse 12 (shown in FIG. 2) to form a fused disconnect switch assembly reminiscent of fused disconnect switch assembly 10 (shown in FIG. 1) but employing switch housing assembly 100 in lieu of switch housing assembly 14 (shown in FIG. 1).

Switch housing assembly 100 includes a housing 102 having fuse terminal openings 104 in a bottom 106 of fuse receptacle 108 for receiving fuse terminal blades 30 (shown in FIG. 2). An electrically conductive resilient clip 109 and associated reinforcing, pre-stressed wire spring element 111 is located below each fuse terminal opening 104 and located in a cavity 110 below fuse receptacle 108. A bridge portion 112 extends outwardly from each clip 109 and to a box style contact assembly 114 located in a wiring cavity 116 for connection to either a line input wire or bus (not shown) or a load wire (not shown). The stripped wires are inserted through wire input ports 118 in wiring cavities 116 and into a wire receptacle 120 in each box style contact assembly 114 located in each wiring cavity 116. A screw type connector 122 is accessed through a top opening 124 in each wiring cavity 116 for securely coupling the line and load wire to the respective box style contact assembly 114. After box style contact assemblies 114 have been wired, a circuit through fuse 12 is completed when fuse terminals 30 (shown in FIG. 2) are inserted through fuse terminal openings 104 and received by clips 109.

As noted above with respect to switch housing assembly 14 (shown in FIGS. 3 and 4) internal conductive portions of switch housing assembly 100 are located below terminal openings 104 of fuse receptacle bottom surface 106, thereby providing a safe disconnect function for fuse 12 by substantially eliminating inadvertent contact with energized conductive portions of switch housing assembly 100. In alternative embodiments, however, it is appreciated that conductive portions of switch housing assembly 100 may remain exposed in fuse receptacle 108 by extending conductive portions of switch housing assembly 100 into receptacle 108 for connection to conductive portions of a fuse. As such, other types of fuses, such as ferrule or cartridge fuses having primary fuse links may be accommodated in addition to or in lieu of fuse 12 (shown in FIGS. 1 and 2 and described above) having terminal blades 30. It is believed that those in the art may make the necessary modifications to switch housing assembly 100 to accommodate these different types of fuses without further explanation.

A switch housing internal alarm terminal 126 is positioned adjacent one of fuse clips 109 within an adjacent cavity 128, and includes a projecting ridge 130 at a top end 132 that protrudes through an opening 134 in a side wall 136 of fuse receptacle 108. Thus, when fuse 12 is fully inserted into fuse receptacle 108, alarm terminal projecting ridge 130 contacts fuse alarm terminal 42 (shown in FIG. 2) through fuse housing opening 44 (shown in FIG. 2). Internal alarm terminal 126 is further coupled to a remote output alarm terminal 138 that extends though a side wall 140 of switch housing 102, thereby completing an electrical path for an open fuse alarm signal for transmission to end use equipment (not shown) during an open fuse condition.

A DIN rail latch 142 is inserted into a slot 144 formed into a lower side of switch housing 102 opposite alarm terminal 138. Slot 144 includes upper and lower positioning grooves 146 for receiving respective positioning ribs 147 of DIN rail latch 142 and ensuring proper positioning of latch 142 relative to switch housing 102. Latch 142 provides snap-on connection and removal of switch housing assembly 100 to and from a 35 mm DIN rail (not shown) received between a latch inner projection 148 and a complementary projection 149 formed into an opposite corner of switch housing 102. Together, projections 148, 149 form a DIN rail slot 150 in a center lower portion of switch housing 102.

A nonconductive cover 152 is affixed to housing 102 to form a safe, protective enclosure for the above-described components of switch housing assembly 100 and to complete fuse receptacle 108. In one embodiment, housing 102 and cover 152 are fabricated from nonconductive materials, such as plastic and thermoplastic materials, capable of withstanding operating environment of the fuse disconnect switch assembly and conditions capable of opening the associated fuse, such as fuse 12 (shown in FIGS. 1 and 2 and described above). In an illustrative embodiment, cover 152 is permanently bonded to housing 102 according to known method and techniques, such as for example, ultrasonic bonding techniques.

A fused disconnect switch assembly is therefore provided that facilitates installation to existing equipment without auxiliary components. Switching is achieved by inserting or extracting a pull out fuse assembly, such as fuse 12, from fuse receptacle 108, and local and remote opened fuse indication provides ready indication of opened fuses for replacement. Because a variety of differently rated fuses are accommodated by switch housing receptacle 108, a versatile fused disconnect system is provided that is suitable for a wide variety of applications.

Figure 7:
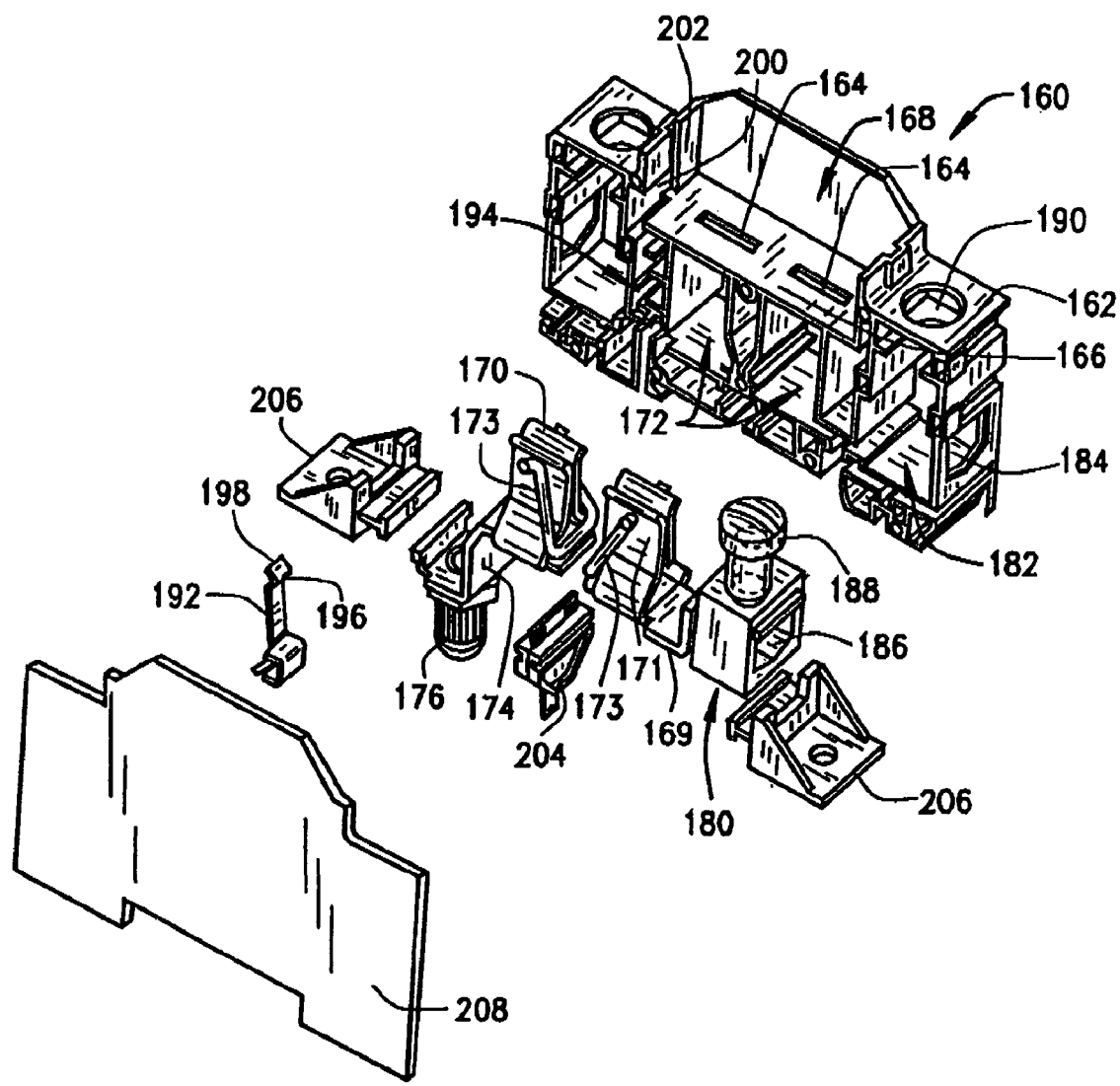
FIG. 7 is a perspective assembly view of a third embodiment of a switch housing assembly.
Figure 8:
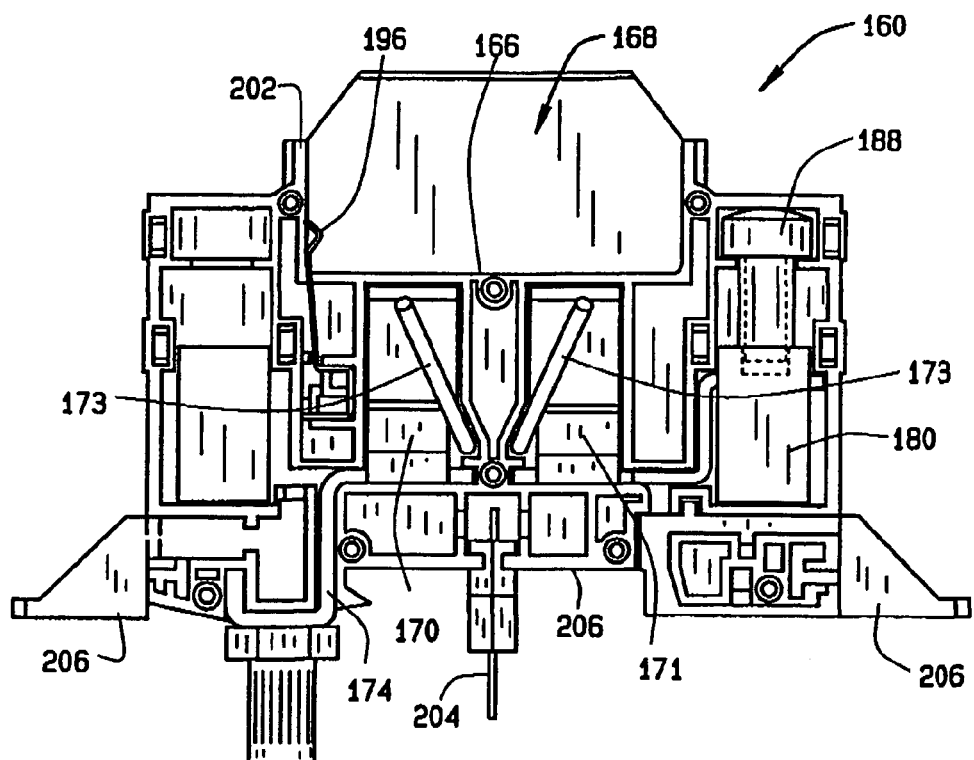
FIG. 8 is a side elevational view with parts removed of the switch housing assembly shown in FIG. 7.

FIGS. 7 and 8 illustrate a third embodiment of a switch housing assembly 160 that combines the features of switch housing assemblies 14 and 100 (described above in relation to FIGS. 3 and 4 and FIGS. 5 and 6, respectively).

Switch housing assembly 160 may be employed with a fuse, such as fuse 12 (shown in FIG. 2) to form a fused disconnect switch assembly reminiscent of fused disconnect switch assembly 10 (shown in FIG. 1) but employing switch housing assembly 160 in lieu of switch housing assembly 14 (shown in FIGS. 1, 3 and 4).

Switch housing assembly 160 includes a housing 162 having fuse terminal openings 164 in a bottom 166 of fuse receptacle 168 for receiving fuse terminal blades 30 (shown in FIG. 2). An electrically conductive resilient clip 170, 171 and associated reinforcing, pre-stressed wire spring element 173 is located below each fuse terminal opening 164 and located in a cavity 172 below fuse receptacle 168. A bridge portion 174 extends downwardly from clip 170 and to an electrically conductive bullet contact assembly 176 for connection to either a line input bus (not shown) or a load bus (not shown). A bridge portion 169 extends outwardly from clip 171 and to a box style contact assembly 180 located in a wiring cavity 182 for connection to either a line input wire (not shown) or a load wire (not shown). A stripped wire is inserted through a wire input port 184 in wiring cavity 182 and into a wire receptacle 186 in box style contact assembly 180. A screw type connector 188 is accessed through a top opening 190 in wiring cavity 182 for securely coupling the line or load wire to box style contact assembly 180. After box style contact assembly 180 has been wired and bullet contact assembly 176 plugged into a bus bar, a circuit through fuse is completed when fuse terminals 30 (shown in FIG. 2) are inserted through fuse terminal openings 164 and received by clips 170, 171.

As noted above with respect to switch housing assembly 100 (shown in FIGS. 5 and 6) internal conductive portions of switch housing assembly 160 are located below terminal openings 164 of fuse receptacle bottom surface 166, thereby providing a safe disconnect function for fuse 12 by substantially eliminating inadvertent contact with energized conductive portions of switch housing assembly 160. In alternative embodiments, however, it is appreciated that conductive portions of switch housing assembly 160 may remain exposed in fuse receptacle 168 by extending conductive portions of switch housing assembly 160 into receptacle 168 for connection to conductive portions of a fuse. As such, other types of fuses, such as ferrule or cartridge fuses having primary fuse links may be accommodated in addition to or in lieu of fuse 12 (shown in FIGS. 1 and 2 and described above) having terminal blades 30. It is believed that those in the art may make the necessary modifications to switch housing assembly 160 to accommodate these different types of fuses without further explanation.

A switch housing internal alarm terminal 192 is positioned adjacent fuse clip 170 within an adjacent cavity 194, and includes a projecting ridge 196 at a top end 198 that protrudes through an opening 200 in a side wall 202 of fuse receptacle 168. Thus, when fuse 12 is fully inserted into fuse receptacle 168, alarm terminal projecting ridge 196 contacts fuse alarm terminal 42 (shown in FIG. 2) through fuse housing opening 44 (shown in FIG. 2). Internal alarm terminal 192 is further coupled to a remote output alarm terminal 204 that extends though a bottom or side of switch housing 160, thereby completing an electrical path for an open fuse alarm signal for transmission to end use equipment during an open fuse condition. In an exemplary embodiment, a conductive wire extends between internal alarm terminal 192 and remote output alarm terminal 204 to establish an electrical connection therebetween.

Mounting tabs 206 extend from either side of switch housing 160 for securing switch housing assembly 160 within the end use application.

A nonconductive cover 208 is affixed to housing 162 to form a safe, protective enclosure for the above-described components of switch housing assembly 160 and to complete fuse receptacle 168. In one embodiment, housing 162 and cover 208 are fabricated from nonconductive materials, such as plastic and thermoplastic materials, capable of withstanding operating environment of the fuse disconnect switch assembly and conditions capable of opening the associated fuse, such as fuse 12 (shown in FIGS. 1 and 2 and described above). In an illustrative embodiment, cover 208 is permanently bonded to housing 162 according to known method and techniques, such as for example, ultrasonic bonding techniques.

A fused disconnect switch assembly is therefore provided that facilitates installation to existing equipment without auxiliary components despite different electrical interfaces between line and load equipment. Switching is achieved by inserting or extracting a pull out assembly, such as fuse 12, from fuse receptacle 168, and local and remote opened fuse indication provides ready indication of opened fuses for replacement. Because a variety of differently rated fuses are accommodated by switch housing receptacle 168, a versatile fused disconnect system is provided that is suitable for a wide variety of applications.

Figure 9:
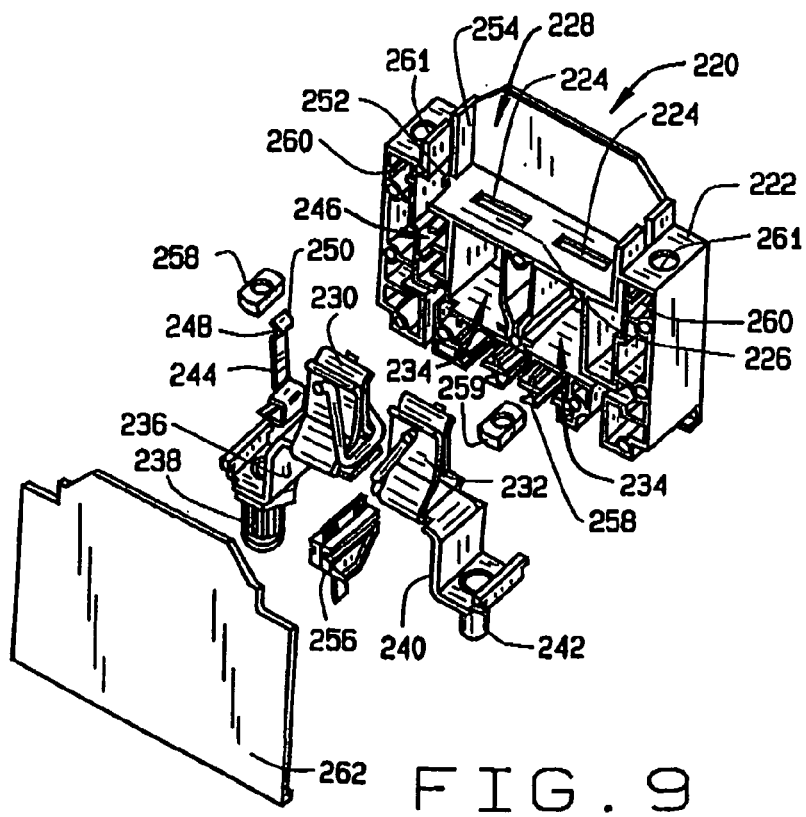
FIG. 9 is a perspective assembly view of a fourth embodiment of a switch housing assembly.

FIG. 9 is a perspective assembly view of a fourth embodiment of a switch housing assembly 220 illustrating another field connection option as described below.

Switch housing assembly 220 may be employed with a fuse, such as fuse 12 (shown in FIG. 2) to form a fused disconnect switch assembly reminiscent of fused disconnect switch assembly 10 (shown in FIG. 1) but employing switch housing assembly 220 in lieu of switch housing assembly 14 (shown in FIGS. 1, 3 and 4).

Switch housing assembly 220 includes a housing 222 having fuse terminal openings 224 in a bottom 226 of fuse receptacle 228 for receiving fuse terminal blades 30 (shown in FIG. 2). An electrically conductive resilient clip 230, 232 is located below each fuse terminal opening 224 and located in a cavity 234 below fuse receptacle 228. A bridge portion 236 extends downwardly from clip 230 and to an electrically conductive bullet contact assembly 238 for connection to either a line input bus (not shown) or a load bus (not shown). A bridge portion 240 extends outwardly from clip 232 and to a terminal stud 242 for connection to line side or load side circuitry according to known mechanisms and techniques. After electrical connection is established to terminal stud 242 and bullet contact assembly 238 is plugged into a bus bar, a circuit through fuse 12 is completed when fuse terminals 30 (shown in FIG. 2) are inserted through fuse terminal openings 224 and received by clips 230, 232.

As noted above with respect to switch housing assembly 160 (shown in FIGS. 7 and 8) internal conductive portions of switch housing assembly 220 are located below terminal openings 224 of fuse receptacle bottom surface 226, thereby providing a safe disconnect function for fuse 12 by substantially eliminating inadvertent contact with energized conductive portions of switch housing assembly 220. In alternative embodiments, however, it is appreciated that conductive portions of switch housing assembly 220 may remain exposed in fuse receptacle 228 by extending conductive portions of switch housing assembly 220 into receptacle 228 for connection to conductive portions of a fuse. As such, other types of fuses, such as ferrule or cartridge fuses having primary fuse links may be accommodated in addition to or in lieu of fuse 12 (shown in FIGS. 1 and 2 and described above) having terminal blades 30. It is believed that those in the art may make the necessary modifications to switch housing assembly 220 to accommodate these different types of fuses without further explanation.

A switch housing internal alarm terminal 244 is positioned adjacent fuse clip 230 within an adjacent cavity 246, and includes a projecting ridge 248 at a top end 250 that protrudes through an opening 252 in a side wall 254 of fuse receptacle 228. Thus, when fuse 12 is fully inserted into fuse receptacle 228, alarm terminal projecting ridge 248 contacts fuse alarm terminal 42 (shown in FIG. 2) through fuse housing opening 44 (shown in FIG. 2). Internal alarm terminal 244 is further coupled to a remote output alarm terminal 256 that extends though a bottom 258 of switch housing 222, thereby completing an electrical path for an open fuse alarm signal for transmission to end use equipment during an open fuse condition. As noted above with respect to FIG. 4, output alarm 256 is selectively positionable within three cavities formed into a lower portion of housing 222 adjacent housing bottom 258.

Mounting insert footings 259 are received in receptacles 260 on either side of fuse receptacle 228 so that switch housing assembly 220 may be secured in position within the end use application. Each mounting footing 259 includes a threaded bore for receiving a fastener (not shown) inserted through mounting apertures 261 located on either side of fuse receptacle 228. Thus, insert footings 259, when engaged by a fastener, securely position switch housing assembly 220 in a desired position.

A nonconductive cover 262 is affixed to housing 222 to form a safe, protective enclosure for the above-described components of switch housing assembly 220 and to complete fuse receptacle 228. In one embodiment, housing 222 and cover 262 are fabricated from nonconductive materials, such as plastic and thermoplastic materials, capable of withstanding operating environment of the fuse disconnect switch assembly and conditions capable of opening the associated fuse, such as fuse 12 (shown in FIGS. 1 and 2 and described above). In an illustrative embodiment, cover 262 is permanently bonded to housing 222 according to known method and techniques, such as for example, ultrasonic bonding techniques.

A fused disconnect switch assembly is therefore provided that facilitates installation to existing equipment despite different electrical interfaces between line and load equipment. Switching is achieved by inserting or extracting a pull out fuse assembly, such as fuse 12 from fuse receptacle 228, and local and remote opened fuse indication provides ready indication of opened fuses for replacement. Because a variety of differently rated fuses are accommodated by switch housing receptacle 228, a versatile fused disconnect system is provided that is suitable for a wide variety of applications.

Figure 10:
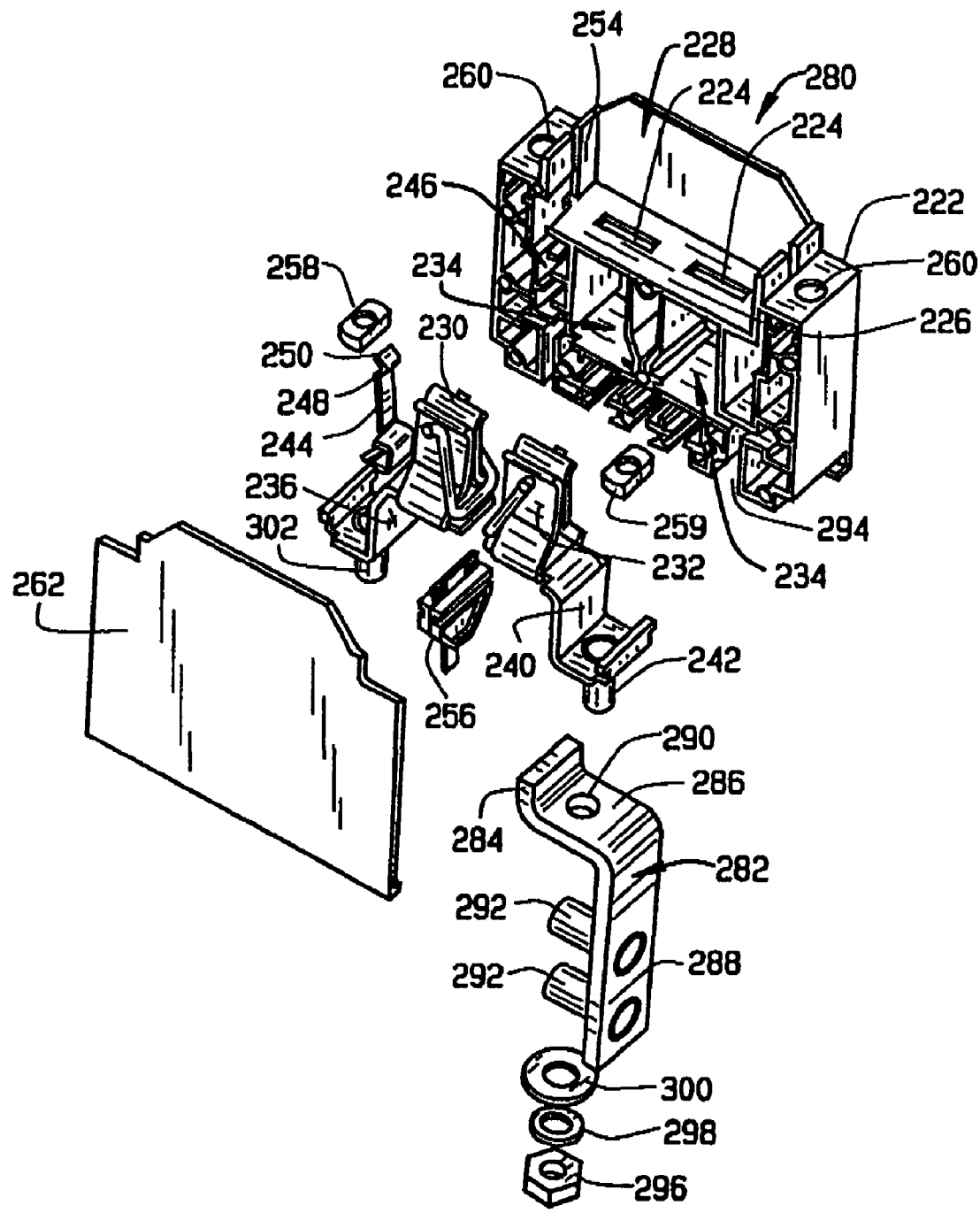
FIG. 10 is a perspective assembly view of a fifth embodiment of a switch housing assembly.
Figure 11:
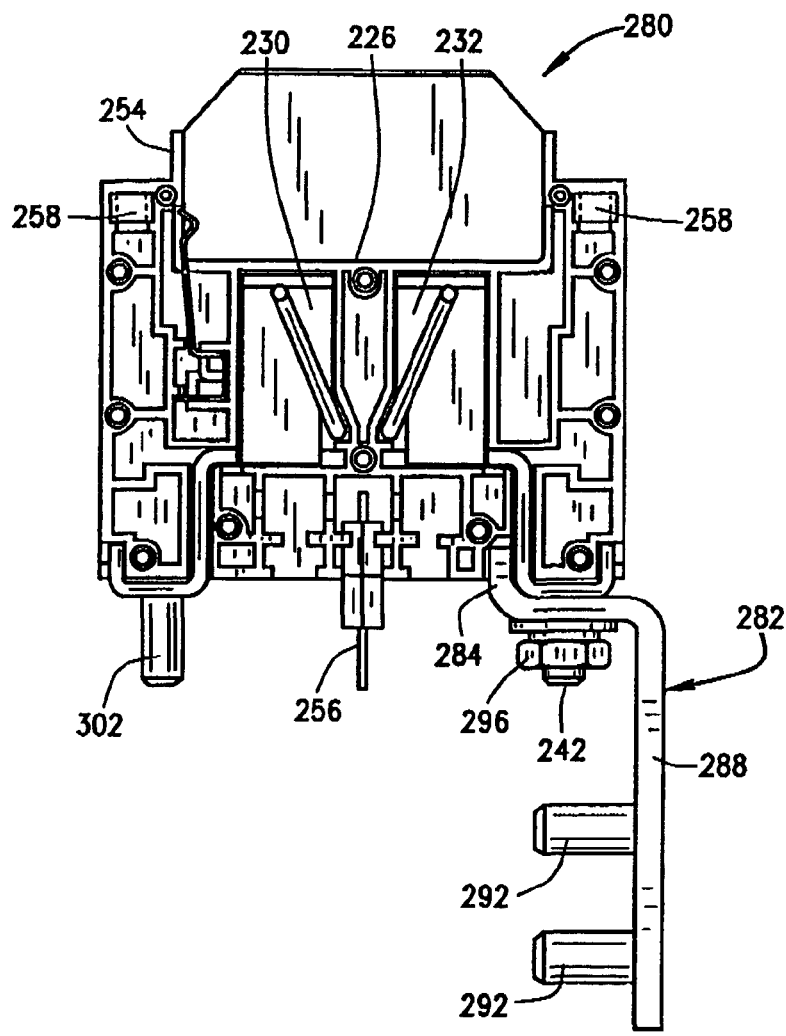
FIG. 11 is a side elevational view with parts removed of the switch housing assembly shown in FIG. 10.

FIGS. 10 and 11 illustrate a fifth embodiment of a switch housing assembly 280 similar to switch housing assembly 220 (shown in FIG. 9) and wherein like components are indicated with like reference characters.

Unlike switch housing assembly 220 (shown in FIG. 9), switch housing assembly 280 further includes a common bus bar 282 for coupling to terminal stud 242. Bus bar 282 includes an anti-rotation flange 284, a flat coupling portion 286, and a bus portion 288 extending substantially perpendicularly to coupling portion 286. Coupling portion 286 includes an aperture 290 therethrough for insertion of terminal stud 242 and bus portion includes two terminal studs 292 for establishing electrical connections according to known techniques and mechanisms. Anti-rotation flange 284 is abutted against terminal bridge portion 240 and contained in a slot 294 formed into housing 222 to ensure proper orientation of bus bar 282 with respect to housing 222. Bus bar 282 is fastened to terminal stud 242 with a nut 296 and washers 298, 300.

It is contemplated that in alternative embodiments other configurations of bus bar 282 may be employed having greater or fewer segment portions without departing from the scope of the present invention. In addition, in alternative embodiments bus portion 288 may include greater or fewer than the illustrated two terminal studs 292 shown in FIG. 10, and other contact mechanisms may be employed in lieu of terminal studs 292. For example, the foregoing contact assemblies, namely a bullet type assembly or a box type assembly, in addition to other known contact formations, may be employed in bus bar 282 without departing from the scope of the present invention.

Still further, and unlike switch housing assembly 220 (shown in FIG. 9) a second terminal stud 302 extends from terminal bridge portion 236 in lieu of bullet contact assembly 238 (shown in FIG. 9). Thus, electrical connections are established to stud 302 according to known methods and techniques to complete an electrical connection through fuse 12 (shown in FIGS. 1 and 2) when fuse 12 is inserted into fuse receptacle 228.

It is contemplated that another common bus bar, such as bus bar 282 could be employed in connection with terminal stud 302 instead of or in addition to bus bar 282 attached to terminal stud 242 as illustrated. Thus, common bus bars may be employed for line side and/or load side electrical connections and auxiliary connections as desired.

A nonconductive cover 262 is affixed to housing 222 to form a safe, protective enclosure for the above-described components of switch housing assembly 280 and to complete fuse receptacle 228. In one embodiment, housing 222 and cover 262 are fabricated from nonconductive materials, such as plastic and thermoplastic materials, capable of withstanding operating environment of the fuse disconnect switch assembly and conditions capable of opening the associated fuse, such as fuse 12 (shown in FIGS. 1 and 2 and described above). In an illustrative embodiment, the cover is permanently bonded to housing 222 according to known method and techniques, such as for example, ultrasonic bonding techniques.

A fused disconnect switch assembly is therefore provided that facilitates installation using common bus bars. Switching is achieved by inserting or extracting a pull out fuse assembly, such as fuse 12, from fuse receptacle 228, and local and remote opened fuse indication provides ready indication of opened fuses for replacement. Because a variety of differently rated fuses are accommodated by switch housing receptacle 228, a versatile fused disconnect system is provided that is suitable for a wide variety of applications.

Figure 12:
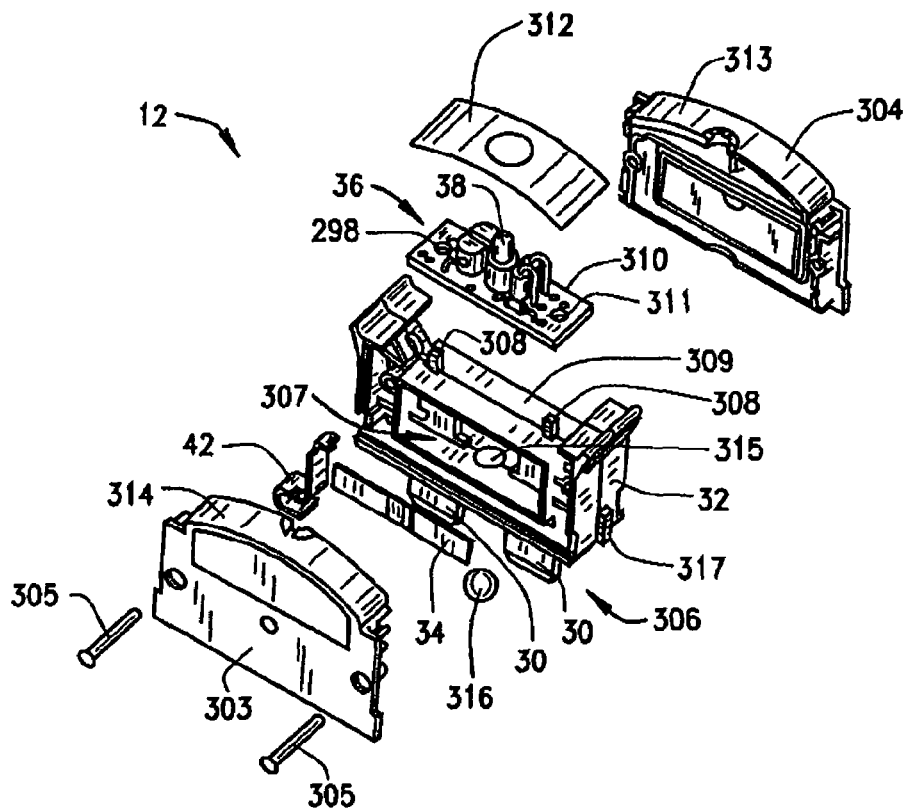
FIG. 12 is a perspective assembly view of the fuse shown in FIG. 2.

FIG. 12 is a perspective assembly view of exemplary pull out fuse assembly 12 for use with the foregoing switch housing assemblies 14 (shown in FIGS. 3 and 4), 100 (shown in FIGS. 5 and 6), 160 (shown in FIGS. 7 and 8), 220 (shown in FIG. 9), and 280 (shown in FIGS. 10 and 11), although it is contemplated that other types of fuses may be likewise employed with switch housing assemblies, 14, 100, 160, 220 and 280.

Fuse 12 includes opposite front and back covers 303, 304, that are attached to one another with known fasteners, including but not limited to rivets 305 and screws (not shown). Disposed between front and back covers 303, 304 is a fuse assembly 306 including fuse housing 32, fuse terminals 30 extending from housing 32, and primary fuse link 34 electrically coupled to fuse terminals 30 within a fuse compartment 307 formed into fuse housing 32. As illustrated in FIG. 12, fuse link 34 is a substantially flat and generally linear conductive strip including an area of reduced cross section, or a weak spot therein. Upon an occurrence of a predetermined current fault condition, dependent upon dimensions and characteristics of fuse link 34, the weak spot reaches an operating temperature sufficient to melt, disintegrate vaporize, decompose, or otherwise open fuse link 34 at or near the weak spot to break an electrical connection through fuse link 34. It is contemplated, however, that a variety of fuse elements may be employed in alternative embodiments in lieu of the illustrative fuse link 34 without departing from the scope of the present invention. For instance, non-linear (e.g., bent or curved) fuse elements, fuse elements including a plurality of weak spots, and wire fuse elements without weak spots, in addition to other fuse elements familiar to those in the art, may be likewise employed in the present invention.

Terminal posts 308 extend through a top surface 309 of fuse compartment 307 for establishing an electrical connection to open circuit indication device 36. Alarm terminal 42 is fitted within a compartment and also is established in electrical communication with open circuit indication device 36.

Open fuse indication device 36 includes a printed circuit board 310 including apertures 311 for electrical connection to terminal posts 308 that are in turn, coupled to fuse terminals 30 that establish line and load electrical connections to external circuitry (not shown). Printed circuit board 310 includes high resistance electronic circuitry, explained below, that operates LED 38 in response to a voltage drop across terminal posts 308 when primary fuse link 34 melts, disintegrates, vaporizes or otherwise opens and breaks an electrical connection between fuse terminals 30 via fuse link 34. As such, LED 38 is illuminated when fuse link 34 operates, thereby providing local fuse state indication. Circuitry on printed circuit board also signals external equipment, such as a relay in a telecommunications system, through alarm terminal 42 and associated alarm terminals of a switch housing assembly, such as assemblies 14, 100, 160, 220 and 280.

A label 312 is attached to a top surface 313, 314 of front and back covers 303, 304, respectively, when fuse 12 is assembled. Label 312, in one embodiment, includes indicia of fuse characteristics and ratings, as well as opening therethrough for accommodating open circuit indication device LED 38 so that fuse state indication is readily ascertainable from visual inspection of LED 38. If LED 38 is not illuminated, fuse 12 is functional, i.e., fuse link 34 has not opened due to fault current conditions. On the other hand, if LED is illuminated, fuse 12 is not operational and should be replaced with a functional fuse.

Fuse assembly 306 further includes an opening 315 extending through bottom of fuse housing 32 to facilitate introduction of an arc quenching media, such as silica sand, to surround terminals 30 and fuse link 34 within fuse compartment 307 to prevent and/or suppress arcing between fuse terminals 30 when fuse link 24 opens. A plug 316 is inserted into opening opening 315 after fuse compartment 307 is filled with the arc quenching media to seal fuse compartment 307 as fuse 12 is assembled. In an exemplary embodiment, plug 316 is a metal ball applied to opening 315 according to known techniques.

Additionally, a polarization projection 317 extends from one side of fuse housing 32 that is received in a complementary groove in a side of a fuse receptacle of a switch housing (see for example, FIG. 1). Projection 317 prevents insertion of fuse 12 into the fuse receptacle except in a designated orientation when projection 317 is inserted into the groove. Thus, correct polarization of the fuse terminals is ensured with respect to associated line and load connections with the applicable switch housing assembly.

Figure 13:
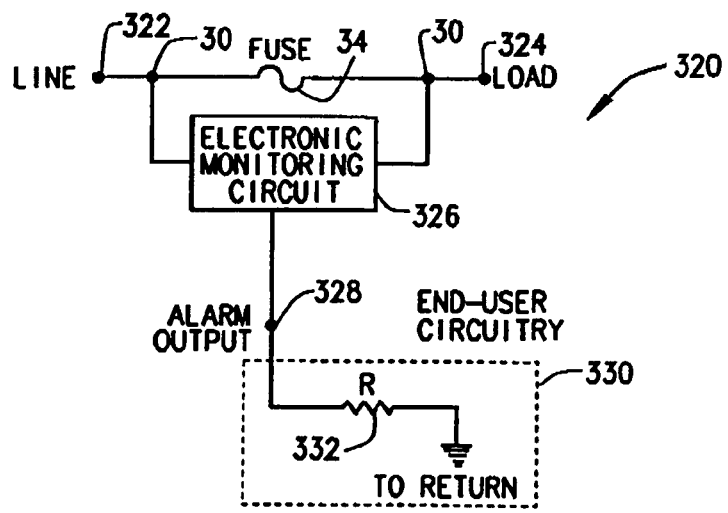
FIG. 13 is an alarm circuit schematic for the fuse shown in FIG. 12.

FIG. 13 schematically illustrates an alarm circuit 320 of fuse 12 (shown in FIGS. 1, 2 and 12) in use. Fuse terminals 30 (shown in FIGS. 1, 2 and 12) are connected to line and load circuitry of the end use application at points 322 and 324 through applicable terminal contact portions of a switch housing assembly, such as those described above. An electrical circuit is therefore established through fuse link 34 (also shown in FIGS. 2 and 12) and through an electronic monitoring circuit 326 formed on printed circuit board 296 (shown in FIG. 12) of open fuse indication device 36 (also shown in FIG. 12). Electronic monitoring circuit 326 has a sufficiently high resistance so that in normal operation of fuse 12 substantially all of the current flowing through fuse 12 passes through fuse link 34.

When fuse link 34 opens in a current overload or short circuit condition, electronic monitoring circuit 326 detects a voltage drop across terminals 30 and illuminates LED 38 (shown in FIG. 12), as well as outputs an alarm signal through alarm terminal 42 (shown in FIGS. 2 and 12) to a remote output alarm terminal 328 of a switch housing assembly, such as assemblies 14, 100, 160, 220 and 280 described above. Alarm terminal output 328 is coupled to end-user circuitry 330 that in an illustrative embodiment, includes a relay 332 that may be used to identify a location of an operated or opened fuse 12 in a system employing a large number of fuses in various locations. In one embodiment, a load side of LED 38 is connected to output alarm terminal 328, thereby supplying 20 mA current to relay 332 for remote fuse state indication. Thus, as LED 38 is energized, a remote alarm signal is also sent through output alarm terminal 328.

Figure 14:
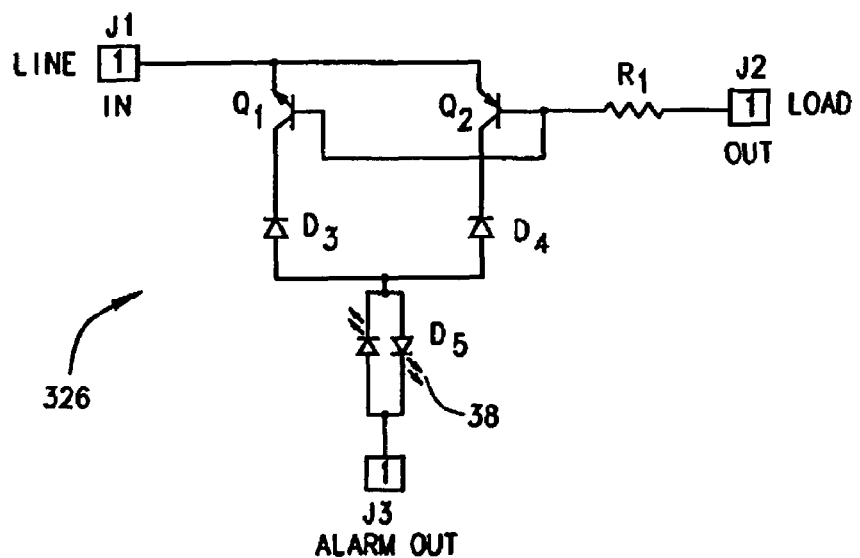
FIG. 14 is an alarm circuit for the fuse shown in FIG. 12.

FIG. 14 illustrates an exemplary electronic monitoring circuit 326 for alarm circuit 330 (shown in FIG. 13). Terminal J1 is coupled to the line or input side of the fuse, and more specifically, to fuse terminal post 308 (shown in FIG. 12) that is associated with line side circuitry of the fuse application. Terminal J2 is coupled to the load or output side of the fuse, and more specifically, to fuse terminal post 308 (shown in FIG. 12) that is associated with load side circuitry of the fuse application. Terminal J3 is electrically connected through an appropriate impedance of to the return or common electrical ground of the fused circuit. A pair of matched transistors, namely an NPN transistor Q1 and a PNP transistor Q2 are employed with diodes D3, D4 to prevent current leakage (about 1.2. mA in one embodiment) through respective transistors Q1, Q2, Therefore, diodes D3, D4 prevent false fuse state indication resulting from low base emitter voltage of transistors Q1 and Q2, and further provide transient immunity for electronic monitoring circuit 316 arc-voltage during operation of the fuse. A bipolar LED 38 (indicated by D5 in FIG. 14 and also shown in FIG. 12) is coupled to transistors Q1, Q2 and terminal J3.

In normal operation, electronic monitoring circuit 326 is a passive component, i.e., active components of electronic monitoring circuit are non-conducting and voltage drop across terminals J1 and J2 is negligible. Consequently, LED 38 is not illuminated and stress on the circuit components is primarily thermal. However, after an overload or short-circuit condition in the fused circuit causes fuse 12, or more specifically fuse link 34 to operate, the resultant voltage drop across terminals J1 and J2 causes either transistor Q1 or Q2, depending upon system voltage polarity, to saturate and actively conduct to energize LED 38.

More specifically, in case of positive system voltage, full system voltage is impressed across terminals J1 and J2 when fuse link 34 has opened, thereby forward biasing a base-emitter junction of PNP transistor Q2 through resistor R1. In this condition, as the base-emitter junction voltage is greater than an associated minimum forward bias voltage, a transistor collector-emitter junction of PNP transistor Q2 saturates and the system voltage is applied across LED 38, thereby illuminating the LED.

In case of a negative system voltage, full system voltage is impressed across terminals J1 and J2 when fuse link 34 has opened, thereby forward biasing a base-emitter junction of NPN transistor Q1 through resistor R1. In this condition, as the base-emitter junction voltage is greater than an associated minimum forward bias voltage, a transistor collector-emitter junction of NPN transistor Q1 saturates and the system voltage is applied across LED 38, thereby illuminating the LED.

Appropriate selection of resistor R1 ensures saturation of transistors Q1, Q2 under positive and negative voltage conditions. Saturation of transistors Q1, Q2 electronically switches the line or input side of the fuse at terminal J1 in series with the alarm output terminal J3, thereby illuminating the bipolar LED 38 to locally indicate the presence of an open-fuse condition. For remote open-fuse alarm indication, terminal J3 is connected to the return or common electrical ground of the fused circuit through a device such as a relay as illustrated in FIG. 13. When an open-fuse condition exists, the electronic monitoring circuit 326 will cause the relay to change state and provide the ability to remotely identify the presence of the open-fuse condition.

In a particular embodiment, transistors Q1 and Q2 have a voltage rating of at least 200 VDC to ensure proper operation of electronic monitoring circuit at system voltages of 80 VDC. In addition, a base current of at least about 100 µA is required in one embodiment for transistors Q1, Q2 to function properly. Still further, in one embodiment, utilizing a minimum turn on voltage of 18 VDC, resistor RI has a value of about 59 Kohms, thereby resulting in a base current of about 300 µA.

While the invention has been described in terms of various specific embodiments, those skilled in the art will recognize that the invention can be practiced with modification within the spirit and scope of the claims.

What is claimed is:

1. A fused disconnect switch comprising:
   an overcurrent protection fuse;
   a switch housing assembly configured to receive said overcurrent protection fuse and comprising a pair of switchable contacts configured to establish an electrical connection through said overcurrent protection fuse;
   a removable open fuse indication device, separately provided from said switch housing assembly, connected in parallel with said overcurrent protection fuse and extendable from said switch housing assembly to facilitate local fuse state indication;
   wherein said electrical connection is completed by inserting said overcurrent protection fuse into the switch housing assembly and the electrical connection is disconnected by extracting said overcurrent protection fuse from the switch housing assembly; and
   an alarm terminal output connected to said open fuse indication device when said open fuse indication device is inserted into the switch housing assembly.

2. A fused disconnect switch assembly in accordance with claim 1 further comprising line and load contact assemblies connected to the pair of switchable contacts, the line and load contact assemblies being selected from the group of bullet contact assemblies, box contact assemblies; terminal studs, and equivalents and combinations thereof.

3. A fused disconnect switch assembly in accordance with claim 1 wherein said open fuse indication device comprises a high resistance electronic circuit.

4. A fused disconnect switch assembly comprising:
   a pull out fuse assembly comprising an overcurrent protection fuse and an open fuse indication device connected in parallel with said overcurrent protection fuse, said open fuse indication device being carded with said overcurrent protection fuse in the pullout fuse assembly; and
   a switch housing assembly for receiving said pull out fuse assembly, said switch housing assembly comprising a line side terminal contact assembly and a load side terminal contact assembly completing an electrical connection through the overcurrent protection fuse;

a remote output alarm terminal extending from said switch housing assembly;

wherein said electrical connection is completed by inserting said overcurrent protection fuse into the switch housing assembly and the electrical connection is disconnected by extracting said overcurrent protection fuse from the switch housing assembly; and wherein said open fuse indication device is visible from an exterior of said switch housing assembly when said electrical connection is completed; and wherein said remote output alarm terminal communicates a signal from said open circuit indication device for remote indication of an open fuse condition.

5. A fused disconnect switch assembly in accordance with claim 4 wherein the line and load contact assemblies include contacts selected from the group of bullet contact assemblies, box contact assemblies, terminal studs, and equivalents and combinations thereof.

6. A fused disconnect switch assembly in accordance with claim 4, said housing further comprising a DIN rail latch.

7. A fused disconnect switch assembly in accordance with claim 4 further comprising a common bus bar extending from one of said first and second terminal contact assemblies.

8. A fused disconnect switch assembly in accordance with claim 4 wherein said open fuse indication device comprises a high resistance electronic circuit.

9. A fused disconnect switch assembly comprising:
fusible means for providing overcurrent circuit protection;
means for removably receiving the fusible means;
means for coupling the means for removably receiving to external circuitry; and
local indication means for visually indicating an operative state of the fusible means, the local indication means being connected in parallel to and carried with the fusible means, wherein when the fusible means is removed from the means for removably receiving the local indication means is likewise removed from the means for removably receiving.

10. A fused disconnect switch assembly in accordance with claim 9, wherein said means for coupling is selected from the group of bullet contact assemblies, box contact assemblies, terminal studs, and equivalents and combinations thereof.

11. A fused disconnect switch assembly in accordance with claim 9 wherein said switch housing assembly further comprises alarm means for communicating an alarm signal to a remote location.

12. A fused disconnect switch assembly in accordance with claim 9 wherein said local indication means comprises a high resistance electronic circuit.

13. A fused disconnect switch assembly in accordance with claim 9 wherein said means for removably receiving comprises a pair of switchable contacts configured to establish an electrical connection through said fusible means.

14. A fused disconnect switch assembly in accordance with claim 13 further comprising a common bus bar extending from one of said switchable contacts.

15. A fused disconnect switch assembly in accordance with claim 9 wherein said means for removably receiving comprises a DIN rail latch.

16. A fused disconnect switch assembly in accordance with claim 9 wherein said fusible means comprises an overcurrent protection fuse.

\* \* \* \* \*

UNITED STATES PATENT AND TRADEMARK OFFICE
CERTIFICATE OF CORRECTION

PATENT NO. : 7,385,518 B2 Page 1 of 1
APPLICATION NO. : 11/393399
DATED : June 10, 2008
INVENTOR(S) : Torrez et al.

It is certified that error appears in the above-identified patent and that said Letters Patent is hereby corrected as shown below:

In Claim 4, Column 14, Line 60, the word "carded" should instead read --carried--, as follows:

"said open fuse indication device being carried with said"

Signed and Sealed this

Twenty-sixth Day of August, 2008

JON W. DUDAS
*Director of the United States Patent and Trademark Office*